US011870479B2

(12) United States Patent
Darling et al.

(10) Patent No.: US 11,870,479 B2
(45) Date of Patent: Jan. 9, 2024

(54) DEVICE FOR PERSONAL EMERGENCY RESPONSE SYSTEM

(71) Applicant: Instant Care, Inc., San Diego, CA (US)

(72) Inventors: Richard Allen Darling, Poway, CA (US); Fong-Min Chang, Diamond Bar, CA (US); Chih-Cheng Tai, Campbell, CA (US)

(73) Assignee: INSTANT CARE, INC., San Diego, CA (US)

( * ) Notice: Subject to any disclaimer, the term of this patent is extended or adjusted under 35 U.S.C. 154(b) by 0 days.

(21) Appl. No.: 17/581,831

(22) Filed: Jan. 21, 2022

(65) Prior Publication Data

US 2022/0239323 A1 Jul. 28, 2022

Related U.S. Application Data

(60) Provisional application No. 63/140,844, filed on Jan. 23, 2021.

(51) Int. Cl.
*H04B 1/38* (2015.01)
*H04B 1/3827* (2015.01)

(52) U.S. Cl.
CPC ................... *H04B 1/385* (2013.01)

(58) Field of Classification Search
CPC ...................................... H04B 1/385
USPC ...................................... 455/90.1
See application file for complete search history.

(56) References Cited

U.S. PATENT DOCUMENTS

| | | | | |
|---|---|---|---|---|
| 2004/0198382 A1* | 10/2004 | Wong | ................... | H04B 1/3827 455/556.1 |
| 2009/0233735 A1* | 9/2009 | Savarese | ............ | G08B 21/0266 473/407 |
| 2013/0110264 A1* | 5/2013 | Weast | .................... | A61B 5/681 700/91 |
| 2020/0250940 A1* | 8/2020 | Davis | ....................... | H04W 4/80 |
| 2021/0281992 A1* | 9/2021 | Selanders | ............... | H04W 4/80 |

\* cited by examiner

*Primary Examiner* — Temica M Beamer
(74) *Attorney, Agent, or Firm* — Profound Law LLP; Shannon Yi-Shin Yen; Weiting Chen

(57) ABSTRACT

Technologies relating to device for personal emergency response system are disclosed. An example wearable device includes a wearable transmitter having a button and an enclosure having an enclosure body, an opening on a rear side of the wearable device, and a window on a front side of the wearable device. The wearable transmitter is secured into the enclosure and the button is configured to be pressed via the opening.

16 Claims, 4 Drawing Sheets

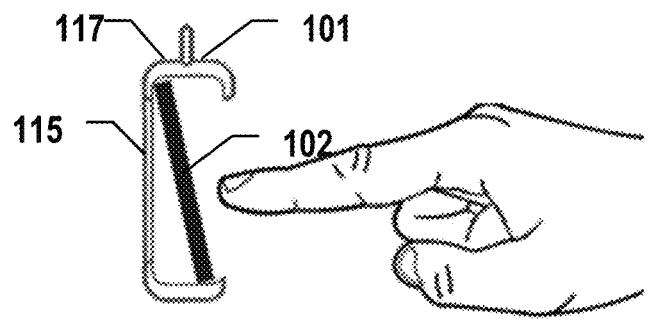
FIG. 2A
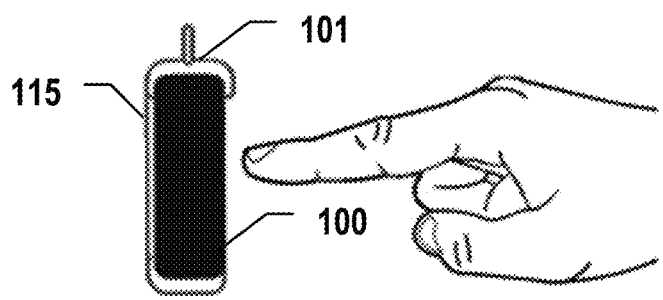
FIG. 2B
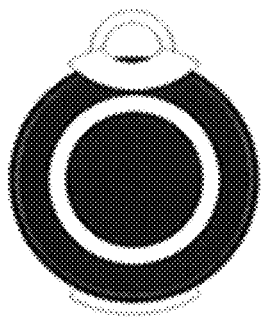 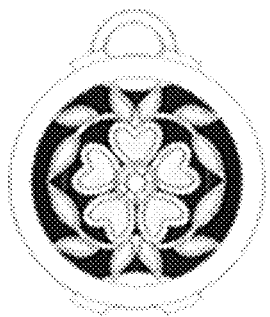
FIG. 2C  FIG. 2D

10

10

DEVICE FOR PERSONAL EMERGENCY RESPONSE SYSTEM

CROSS-REFERENCE TO RELATED APPLICATION

This application claims priority under 35 U.S.C. § 119(e) of the U.S. Provisional Patent Application Ser. No. 63/140,844, filed Jan. 23, 2021, and titled, "A Rearward Triggered Wireless Assistance-Calling Button For Personal Emergency Response Systems With A Printable And Interchangeable Graphic Plate And Device Mount," which is also hereby incorporated by reference in its entirety for all purposes.

FIELD OF INVENTION

The present disclosure relates generally to device for personal emergency response system and more specifically to a device with a triggered wireless assistance-calling button on a rear side and a printable or interchangeable graphic plate on a front side.

BACKGROUND

In today's rapidly aging world we see a growing number of the U.S. population becoming 65 years of age or older. Devices called Personal Emergency Response Systems (PERS) are offered to seniors as a way to insure 24 hour, 7 day per week personal safety monitoring in the event of an unforeseen accident or health emergency.

With advancing technologies, many of these personal emergency response systems have become small enough to be wearable, or offer wireless transmitters that when worn can be used to trigger a personal emergency response system. Having a wearable device provides the freedom to move around with a peace of mind that one is protected anywhere they are located, and at any given time. While this provides unquestioned freedom, it does have its share of difficulties.

One issue facing providers of Personal Emergency Response Systems (PERS) is ensuring that users of these systems actually wear their wireless devices. It is a known fact that a high percentage of new PER's customers return their life-saving system within the first 30 days due to the aesthetics of the wireless wearable transmitter. Unfortunately, current PERS devices are generally unattractive and create a stigma for individuals wearing them. Users of PERS systems have expressed that the wearable devices and transmitters are a beacon that promotes personal insecurities of weakness or frailty. This stigma can actually cause catastrophic results when a sudden emergency occurs and the user isn't wearing their PERS device.

SUMMARY

In one aspect, a wearable device includes a wearable transmitter having a button and an enclosure having an enclosure body, an opening on a rear side of the wearable device, and a window on a front side of the wearable device. The wearable transmitter is secured into the enclosure and the button is configured to be pressed via the opening.

In some implementation, the wearable transmitter includes a wireless wearable transmitter configured to transmit data to and from the wearable transmitter via cellular, landline, Bluetooth, Wi-Fi, or any other communication method.

In some implementation, the wearable transmitter has a round shape such that it is configured to be inserted and fitted into the shape of the enclosure.

In some implementation, the wearable transmitter is made of elastic material comprising natural gum, rubber, elastomers, resilin, or nylon.

In some implementation, the wearable transmitter is configured to activate security systems for residential or commercial properties.

In some implementation, the wearable transmitter is configured to activate Bluetooth devices such as medical systems for testing biometric conditions including heart rate, blood pressure, or glucose readings.

In some implementation, compliance or regulatory codes or phrases are shown on the button or other surface of the wearable transmitter in the rear side of the wearable device.

In some implementation, the enclosure includes a stopper on the rear side of wearable device configured to hold the wearable transmitter in the enclosure.

In some implementation, the window includes a transparent or translucent material comprising glass, acrylic, thin fabrics, or plastics.

In some implementation, the enclosure further includes a bail coupled to the enclosure body such that the enclosure is configured to be connected to a rope via the bail.

In some implementation, the enclosure is designed to provide additional shock protection against accidental impact.

In some implementation, the enclosure further includes a watertight seal on the rear side of the wearable device.

In some implementation, the enclosure further includes an antenna signal booster coupled to the enclosure body.

In some implementation, the wearable device further includes an interchangeable graphic component secured into the enclosure between the window and the wearable transmitter, wherein the interchangeable graphic component comprises a graphic pattern.

In some implementation, the interchangeable graphic component includes paper, plastic, glass, acrylic, rubber, or any materials that is configured to have a graphic pattern thereon.

In some implementation, the interchangeable graphic component is configured to be a part of the wearable transmitter or a part of the enclosure.

In another aspect, an enclosure includes an enclosure body, an opening on a rear side of the enclosure, and a window on a front side of the enclosure. A wearable transmitter having a button is configured to be secured into the enclosure and the button is configured to be pressed via the opening.

In some implementation, the enclosure further includes a stopper on the rear side of enclosure configured to hold the wearable transmitter in the enclosure.

In some implementation, the window includes a transparent or translucent material comprising glass, acrylic, thin fabrics, or plastics.

In some implementation, the enclosure further includes a bail coupled to the enclosure body such that the enclosure is configured to be connected to a rope via the bail.

BRIEF DESCRIPTION OF THE DRAWINGS

FIGS. 2A-2D are schematic diagrams illustrating how a wearable transmitter and an interchangeable graphical component being inserted into the example wearable device in accordance with some implementations of the present disclosure.

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
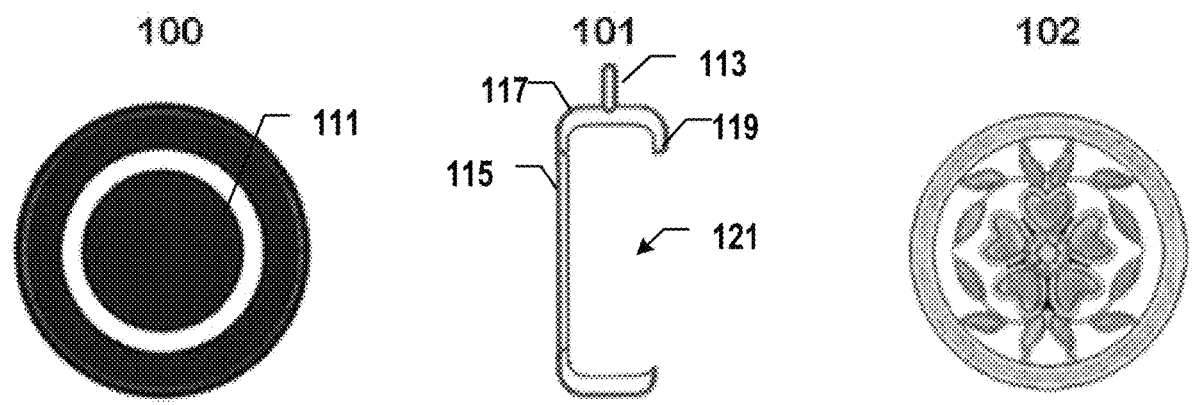
FIG. 1 is a schematic diagram illustrating an example wearable device in accordance with some implementations of the present disclosure.

Technologies relating to device for personal emergency response system and more specifically to device with a triggered wireless assistance-calling button on a rear side and a printable or interchangeable graphic plate on a front side are disclosed. The technologies described in the present disclosure may provide the following technical advantages.

First, a conventional wearable device with a wireless transmitter switch or button should be a part of the wearable device. Also, the conventional wearable device offers a static pattern due to the incredibly high cost to customize a limited product run, and thus the styles of the conventional wearable devices are limited to their initial appearances and cannot be modified according to user's preference. The present disclosure, according to some implementations, may include an enclosure structure/construction to be used as a housing, a case, a shell, or an outer covering of a wearable device. The enclosure structure disclosed herein offers interchangeable graphic components that are, for practical purposes, identical. Specifically, the interchangeable graphic components disclosed herein may be made to ensure that they fit into any assembly of the same/similar type. One of the key features of this unique enclosure structure is the ability to use graphic components that are capable of having individually unique graphics/patterns printed on them. These customized printable pieces of the graphic components address the problem of high cost for limited production runs by allowing the user to freely replace the graphic components in the enclosure. It is noted that the enclosure disclosed herein may include a housing, a case, a shell, an adaptor, an outer covering, or any construction that can be used of a wearable device. It is also noted that the wearable device herein may include a remote device, a pendant device, an ornament device that has an aesthetic appearance that a user may wear it.

Second, the construction method disclosed herein utilizes a principle where a wearable transmitter used to trigger a signal for emergency is positioned in such a manner that its triggering mechanism is positioned in an orientation such that plunging or actuating the device uses the strength of the thumb verses potentially weaker digits of the hand. This is particularly important for older individuals or those experiencing degenerative issues with their hands. In some embodiments, the wearable transmitter is constructed to be put into the enclosure in a way that causes a majority of users to intuitively position the trigger side facing the user by having a design pattern side on the opposing side of the wearable transmitter. This disclosure allows wearable transmitter to adapt to the enclosure without the need to have costly tooling enhancement or changes to the existing wearable transmitter.

Specifically, this disclosure provides advantageous aspects including the following:

First, it makes the user intuitively wear the button of the wearable transmitter in a reversed (backward) manner causing the lifesaving actuator button to be more accessible. In some embodiments, the wearable device contains a first side and a second side, wherein the first side is at an opposite side of the wearable device from the second side. The first side is constructed to have a graphic pattern and the second side is constructed to have the trigger (help requesting button) interface/trigger button. The construction of the wearable device makes a user naturally want to present the graphic pattern facing outward while positing the trigger button inward facing the body of the user. Such positioning provides advantageous features including i) ergonomically positions the trigger button to allow the user to more easily trigger the button with a thumb, ii) provides a flatter surface (e.g., user's body) and hides the trigger mechanism preventing unwanted trigger of the button by accidents.

Second, it enhances the aesthetics of the existing device without requiring a costly tooling change.

Regarding ergonomic design for elders, it is of critical importance to note that by placing the button of the wearable transmitter into the enclosure reversed or backward from its typical orientation, it delivers a critical value of intuitiveness for the elders as they will automatically wear the wearable transmitter with the printed interchangeable design facing outward thus making the wearable device much elder friendly and intuitive for the elderly wearer. This disclosure creates an intuitive and naturally way to ensure a life saving device is worn in a reversed more accessible orientation without any need for explanation to the elders.

In other words, the present disclosure provides a mechanism of causing a user to position a device in a predetermined orientation by invoking user's (e.g., human's) Predisposed Cognitive Triggering Process (hereinafter "PCTP"), including perceiving, judging, deciding, and triggering the user's action to perform/confine to a pre-set action of the device designer.

The physical and conceptual constructions disclosed herein with interchangeable and printable graphical component methodology promotes positive reinforcement through technically advanced interchangeable designs that generate a desirable or pleasant stimulus for the user. The desirable stimulus reinforces the users behavior to wear these unique safety wearable transmitters, making it more likely that the behavior reoccurs ensuring safer and healthier wearing preferences towards the acceptance of the life saving wireless devices. In addition, the enclosure uses a method where the wearable trigger mechanism is reversed such that a wearers thumb is used to activate the device.

In operation, identifying a way to produce a wearable device that promotes a positive emotional experience and developing better wearing habits while offering a construction that allows for better activation by using the strength of a user's thumb.

FIG. 1 is a schematic diagram illustrating an example wearable device 10 in accordance with some implementations of the present disclosure. As shown in FIG. 1, wearable device 10 may include a wearable transmitter 100 having a button 111 in the middle of wearable transmitter 100. In some implementations, wearable transmitter 100 includes a wireless wearable transmitter that is configured to transmit data (e.g., emergency signals) to and from wearable transmitter 100. In some implementations, wearable transmitter 100 has a round shape such that it can be inserted and fitted into the shape of the enclosure. It is noted that the shape of wearable transmitter 100 can include a triangle, rectangle, pentagon, hexagon, or polygon in a front view. In some implementations, wearable transmitter 100 can be made of elastic material including natural gum, rubber, elastomers, resilin, or nylon, such that wearable transmitter 100 can be inserted into the enclosure by squishing or press wearable transmitter 100 into a flatter shape. In some implementations, wearable transmitter 100 is configured to transmits a wireless radio frequency (RF) signal to a personal emergency response system (PERS). The PERS then communicates an emergency signal via cellular, landline, Bluetooth, Wi-Fi, or any other communication method. In some embodiment, the enclosure is used with wearable transmitter 100 that transmits a wireless signal to a receiver such as a call center or an electronic receiver. In some implementations, wearable transmitter 100 is configured to activate security systems for residential or commercial properties. In some implementations, wearable transmitter 100 is configured to activate Bluetooth devices such as medical systems for testing biometric conditions including heart rate, blood pressure, or glucose readings. In some implementations, compliance or regulatory codes or phrases are shown on the button 111 or other surface of wearable transmitter 100 in the rear side of wearable device 10.

Wearable device 10 may further include an enclosure 101. Enclosure 101 may include an enclosure body 117 having a stopper 119 on a rear side of enclosure 101 in order to keep wearable transmitter 100 in enclosure 101. In some implementations, since enclosure 101 has a round shape, stopper 119 can be formed on entire edge of the round shape on the rear side of enclosure 101. In some implementations, stopper 119 can be only formed on parts of the edge of the round shape (e.g., top edge and bottom edge of the round shape) such that stopper 119 can still hold wearable transmitter 100 in enclosure 101 while it makes it easier to insert wearable transmitter 100 into enclosure 101. Enclosure 101 may include an opening 121 on the rear side of enclosure 101 such that the user may insert wearable transmitter 100 into enclosure 101 via opening 121. In some implementations, enclosure body 117 has a socket structure configured to immobilize wearable transmitter 100 by a clipping motion.

Enclosure 101 may also include a window 115 coupled to enclosure body 117. In some implementations, window 115 may be a transparent or translucent material including glass, acrylic, thin fabrics, or plastics, such that the graphic pattern of the interchangeable graphic component can be visually shown from the front side of enclosure 101. In some implementations, since enclosure 101 has a round shape, window 115 can also be a round shape and can be formed coupled to the edge of stopper 119 on the front side of enclosure 101. In some implementations, the entire enclosure 101 can be made by a single piece such that enclosure body 117, stopper 119, and window 115 can be seen as a single component.

Enclosure 101 further includes a bail or a hook hole 113 attached to or coupled to enclosure body 117 such that enclosure can be connected to a rope, cord, a chain, or a lanyard (not shown) via bail 113. The rope is configured to hang around a user's neck or other parts of the body or clothes so that wearable device 10 can be seen as an accessory (e.g., a pendant) rather than a personal emergency response button. In some implementations, enclosure 101 further includes other attachments such that wearable device 10 may be attached to a user's wrist, waist, or anywhere on the user's body.

In some implementations, enclosure 101 is designed to provide additional shock protection (e.g., accidental triggering and device structural integrity) against accidental impact when wearable device 10 is dropped. In some implementations, enclosure 101 may further include a watertight seal on rear side of wearable device 10 to make wearable device 10 water resistant, or add an additional level of water resistance such that it protects wearable transmitter 100 from water damages. In some implementations, enclosure 101 is configured to serve to protect wearable transmitter 100 from outside contaminants including dirt, dust, or grease.

In some implementations, enclosure 101 may further include an antenna signal booster (not shown) coupled to enclosure body 117 such that it can improve signal transmission of wearable transmitter 100. In some implementations, enclosure 101 may further contain at least an area (e.g., the entirety) that does not block RF signals, such as by using materials that does not block RF signals.

Wearable device 10 may further include an interchangeable graphic component 102. Interchangeable graphic component 102 may include paper, plastic, glass, acrylic, rubber, or any materials that can have a graphic pattern thereon. Interchangeable graphic component 102 may have a graphic pattern on a front side. Interchangeable graphic component 102 may include a printable prints (or a printable) such that it allows the user to change interchangeable graphic component 102 as her wish. In some implementations, interchangeable graphic component 102 has a round shape such that it can be inserted and fitted into the shape of enclosure 101. It is noted that the shape of interchangeable graphic component 102 can include a triangle, rectangle, pentagon, hexagon, or polygon in a front view. In some implementations, interchangeable graphic component 102 can be a part of wearable transmitter 100 or a part of enclosure 101.

FIGS. 2A-2D are schematic diagrams illustrating how a wearable transmitter and an interchangeable graphical component being inserted into the example wearable device in accordance with some implementations of the present disclosure. First, as shown in FIG. 2A, interchangeable graphic component 102 may be inserted into enclosure body 117 of enclosure 101 by pushing interchangeable graphic component 102 into a front end of enclosure body 117 until it contacts or attached to window 115 of enclosure 101. Next, wearable transmitter 100 is then inserted into enclosure body 117 of enclosure 101 by pushing wearable transmitter 100 into the front end of enclosure body 117 until it contacts or attaches to interchangeable graphic component 102. After both interchangeable graphic component 102 and wearable transmitter 100 being inserted, FIG. 2C shows the rear side view of wearable device 10 and FIG. 2D shows the front side view of wearable device 10. As mentioned above, window 115 allows the graphic pattern of interchangeable graphic component 102 to be visually shown from the front side view of wearable device 10.

Figure 3:
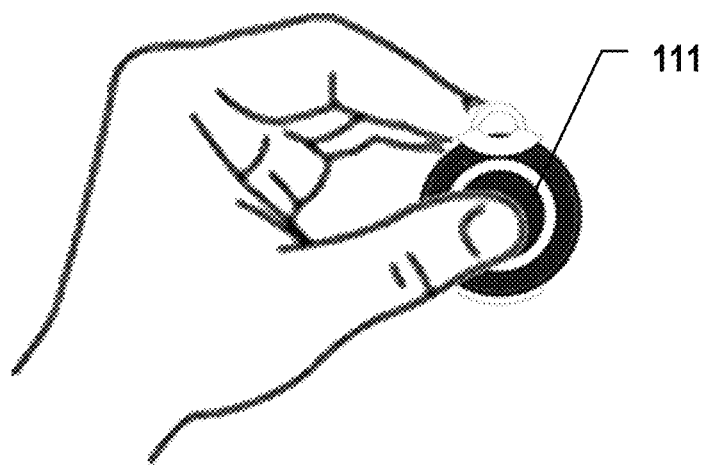
FIG. 3 is a schematic diagram illustrating how a user can trigger the wearable transmitter of the example wearable device in accordance with some implementations of the present disclosure.

FIG. 3 is a schematic diagram illustrating how a user can trigger the wearable transmitter of the example wearable device in accordance with some implementations of the present disclosure. As shown in FIG. 3, a user may perform a precision thumb-finger pinch grip to activate the wearable transmitter 100 by holding wearable device 10 and pressing button 111 on the rear side of wearable device 10.

Figure 4A:
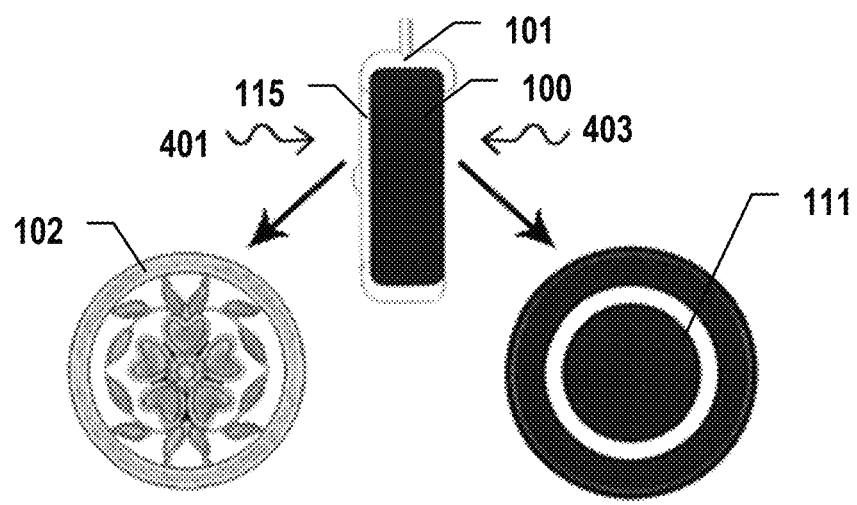
FIGS. 4A-4B are schematic diagrams illustrating how the example wearable device hangs on the user's neck in accordance with some implementations of the present disclosure.
Figure 4B:
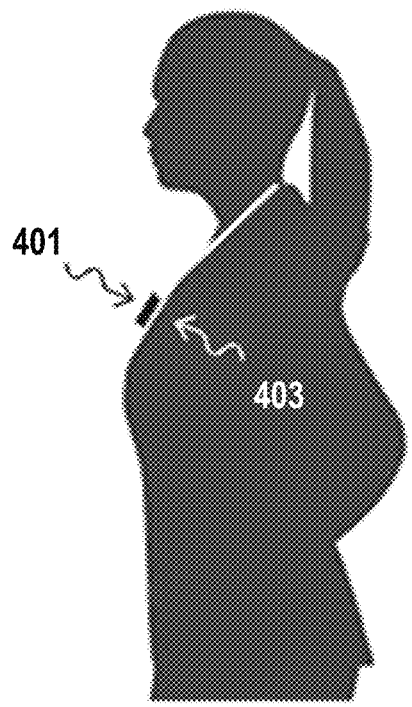

FIGS. 4A-4B are schematic diagrams illustrating how the example wearable device hangs on the user's neck in accordance with some implementations of the present disclosure. As shown in FIG. 4A, wearable transmitter 100 has been inserted into enclosure 101. The graphic patter of interchangeable graphic component 102 can be visually seen from window 115 of enclosure 101 on a front side 401 of wearable device 10. Button 111 of wearable transmitter 100 can be pressed by a user during emergency from a rear side 403 of wearable device 10. Also, as shown in FIG. 4B, wearable device 10 can hang on a user having front side 401 (e.g., label side) facing away from the user and having rear side 403 (e.g., an alarm triggering button side 403) facing toward a body of the user.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A wearable device comprising:
    a wearable transmitter configured to trigger a signal for emergency comprising a button; and
    an enclosure comprising an enclosure body and a window coupled to the enclosure body on a first side of the enclosure, wherein the wearable transmitter is secured into the enclosure such that the button is accessible to be pressed via an opening of the enclosure body in a second side of the enclosure, wherein the first side is opposite to the second side, and wherein the window comprises a transparent or translucent material comprising glass, acrylic, fabric, or plastic.

2. The wearable device according to claim 1, further comprising:
    an interchangeable graphic component secured into the enclosure between the window and the wearable transmitter, wherein the interchangeable graphic component comprises a graphic pattern that is visible from the window.

3. The wearable device according to claim 2, wherein the interchangeable graphic component comprises paper, plastic, glass, acrylic, rubber, or any material that is configured to have a graphic pattern thereon.

4. The wearable device according to claim 1, wherein the wearable transmitter comprises a wireless wearable transmitter that is configured to transmit data to and from the wearable transmitter via cellular, Bluetooth, Wi-Fi, or other communication method.

5. The wearable device according to claim 1, wherein the wearable transmitter has a round shape such that the wearable transmitter fits the shape of the enclosure.

6. The wearable device according to claim 1, wherein the wearable transmitter is made of elastic material comprising natural gum, rubber, elastomers, resilin, or nylon.

7. The wearable device according to claim 1, wherein the wearable transmitter is configured to activate security systems.

8. The wearable device according to claim 1, wherein the wearable transmitter is configured to activate medical systems for testing biometric conditions including heart rate, blood pressure, or glucose readings.

9. The wearable device according to claim 1, wherein compliance or regulatory codes or phrases are on the button or other surface of the wearable transmitter in the second side of the wearable device.

10. The wearable device according to claim 1, wherein the enclosure comprises a stopper on the second side of wearable device configured to hold the wearable transmitter in the enclosure.

11. The wearable device according to claim 1, wherein the enclosure further comprises a bail coupled to the enclosure body such that the enclosure is configured to be connected to a rope via the bail.

12. An enclosure comprising:
    an enclosure body;
    a window coupled to the enclosure body on a first side of the enclosure, wherein the enclosure body comprises an opening on a second side of the enclosure, wherein the first side is opposite to the second side, and wherein the window comprises a transparent or translucent material comprising glass, acrylic, fabric, or plastic; and
    a stopper on a second side of the enclosure to hold a wearable transmitter that is configured to trigger a signal for emergency in the enclosure.

13. The enclosure according to claim 12, further comprising:
    an interchangeable graphic component secured into the enclosure between the window and the wearable transmitter, wherein the interchangeable graphic component comprises a graphic pattern.

14. The wearable device according to claim 1, wherein the wearable transmitter is squishable.

15. The wearable device according to claim 10, wherein the stopper is on an entire edge of enclosure body.

16. The wearable device according to claim 10, wherein the stopper is on a part of an edge of enclosure body.

\* \* \* \* \*